(12) United States Patent
Raminosoa et al.

(10) Patent No.: US 9,236,784 B2
(45) Date of Patent: Jan. 12, 2016

(54) FLUX-SWITCHING ELECTRIC MACHINE

(75) Inventors: Tsarafidy Raminosoa, Niskayuna, NY (US); Manoj Ramprasad Shah, Latham, NY (US)

(73) Assignee: General Electric Company, Schenectady, NY (US)

( * ) Notice: Subject to any disclaimer, the term of this patent is extended or adjusted under 35 U.S.C. 154(b) by 860 days.

(21) Appl. No.: 13/436,481

(22) Filed: Mar. 30, 2012

(65) Prior Publication Data

US 2013/0257188 A1 Oct. 3, 2013

(51) Int. Cl.
*H02K 19/10* (2006.01)
*H02K 19/24* (2006.01)

(52) U.S. Cl.
CPC .............. *H02K 19/24* (2013.01); *H02K 19/103* (2013.01)

(58) Field of Classification Search
CPC ............................... H02K 19/10; H02K 19/12
USPC ................................................... 310/166, 208
See application file for complete search history.

(56) References Cited

U.S. PATENT DOCUMENTS

| | | | |
|---|---|---|---|
| 4,450,396 A * | 5/1984 | Thornton | 318/721 |
| 4,918,831 A * | 4/1990 | Kliman | 29/598 |
| 6,140,729 A | 10/2000 | Pollock et al. | |
| 6,504,281 B1 * | 1/2003 | Smith et al. | 310/190 |
| 6,787,958 B1 | 9/2004 | Walter | |
| 6,850,029 B1 | 2/2005 | Pollock et al. | |
| 7,518,331 B2 | 4/2009 | Fujino et al. | |
| 7,868,506 B2 | 1/2011 | Hoang et al. | |
| 8,022,649 B2 | 9/2011 | Pollock et al. | |
| 2006/0197396 A1 | 9/2006 | Pollock et al. | |
| 2006/0273681 A1 * | 12/2006 | Durham et al. | 310/180 |
| 2008/0093948 A1 * | 4/2008 | Naganawa | 310/203 |
| 2008/0238236 A1 * | 10/2008 | El-Refaie | 310/166 |
| 2009/0091198 A1 | 4/2009 | Husband et al. | |

FOREIGN PATENT DOCUMENTS

JP 2010081782 * 4/2010 ............. H02K 19/10

OTHER PUBLICATIONS

Zulu, Ackim, "A Wound-Field Three-Phase Flux-Switching Synchronous Motor With All Excitation Sources on the Stator", IEEE Transactions on Industry Applications, vol. 46, No. 6, Nov./Dec. 2010, pp. 2363-2371.

Sulaiman, Ewan, "A New Structure of 12Slot-10Pole Field-Excitation Flux Switching Synchronous Machine for Hybrid Electric Vehicles", Dept. of Electrical & Computer Engineering, Nagoya Institute of Technology, Gokiso, Showa, Nagoya, Aichi, 466-8555.

\* cited by examiner

*Primary Examiner* — Terrance Kenerly
(74) *Attorney, Agent, or Firm* — The Small Patent Law Group, LLC; Christopher R. Carroll

(57) ABSTRACT

A flux-switching electric machine includes a rotor having a rotor core that is configured to rotate about a central longitudinal axis. The rotor core has a circumference that includes an approximately constant radius of curvature along an arc length of the rotor core. The rotor core includes magnetic and non-magnetic segments that are arranged in an alternating pattern of magnetic segments and non-magnetic segments along the arc length of the rotor core. The flux-switching electric machine also includes a stator having a stator core that extends a length along the central longitudinal axis. The stator core includes a stator base and stator teeth that extend radially from the stator base relative to the central longitudinal axis. The stator includes a direct current (DC) field coil wound around at least one corresponding stator tooth. The stator includes an alternating current (AC) armature coil wound around at least one corresponding stator tooth. The DC field coil overlaps the AC armature coil along an arc length of the stator core.

20 Claims, 10 Drawing Sheets

FLUX-SWITCHING ELECTRIC MACHINE

BACKGROUND

Rotating electric machines are used for a wide variety of applications, such as automotive applications, aerospace applications, industrial applications, and/or the like. Rotating electric machines include a rotor and a stator. A rotating electric machine may be an electrical motor, wherein the rotor rotates relative to the stator to convert electrical energy to mechanical energy. Rotating electric machines also include electrical generators, wherein the relative rotation between the rotor and the stator converts mechanical energy to electrical energy.

Some rotating electric machines are used under relatively harsh and/or relatively extreme operating conditions. For example, some rotating electric machines are used wherein the rotating electric machine is exposed to high temperatures, low temperatures, moisture, chemicals, dust, abrasive materials, and/or the like. A switched reluctance machine (SRM) is one example of a rotating electric machine that may be suitable for use under relatively harsh and/or relatively extreme operating conditions. However, SRMs may be prone to excessive noise and/or vibration. Moreover, and for example, SRMs may experience high torque ripple, may have poor controllability, and/or may have a poor power factor.

BRIEF DESCRIPTION

In one embodiment, a flux-switching electric machine includes a rotor having a rotor core that is configured to rotate about a central longitudinal axis. The rotor core has a circumference that includes an approximately constant radius of curvature along an arc length of the rotor core. The rotor core includes magnetic and non-magnetic segments that are arranged in an alternating pattern of magnetic segments and non-magnetic segments along the arc length of the rotor core. The flux-switching electric machine also includes a stator having a stator core that extends a length along the central longitudinal axis. The stator core includes a stator base and stator teeth that extend radially from the stator base relative to the central longitudinal axis. The stator includes a direct current (DC) field coil wound around at least one corresponding stator tooth. The stator includes an alternating current (AC) armature coil wound around at least one corresponding stator tooth. The DC field coil overlaps the AC armature coil along an arc length of the stator core.

In another embodiment, a flux-switching electric machine includes a rotor having a rotor core that is configured to rotate about a central longitudinal axis. The rotor core has a circumference that includes an approximately constant radius of curvature along an arc length of the rotor core. The rotor core includes magnetic and non-magnetic segments that are arranged in an alternating pattern of magnetic segments and non-magnetic segments along the arc length of the rotor core. The magnetic and non-magnetic segments are integrally formed with each other from a magnetic material. The non-magnetic segments are rendered non-magnetic after being formed from the magnetic material. A stator includes a stator core that extends a length along the central longitudinal axis. The stator core includes a stator base and stator teeth that extend radially from the stator base relative to the central longitudinal axis. The stator includes a direct current (DC) field coil wound around at least one corresponding stator tooth. The stator includes an alternating current (AC) armature coil wound around at least one corresponding stator tooth. The DC field coil overlaps the AC armature coil along an arc length of the stator core.

In another embodiment, a flux-switching electric machine includes a rotor having a rotor core that is configured to rotate about a central longitudinal axis. The rotor core has a circumference that includes an approximately constant radius of curvature along an arc length of the rotor core. The rotor core includes magnetic and non-magnetic segments that are arranged in an alternating pattern of magnetic segments and non-magnetic segments along the arc length of the rotor core. The rotor core is fabricated with rotor slots that extend between adjacent magnetic segments along the arc length of the rotor core. The non-magnetic segments include filler material that fills the rotor slots. A stator includes a stator core that extends a length along the central longitudinal axis. The stator core includes a stator base and stator teeth that extend radially from the stator base relative to the central longitudinal axis. The stator includes a direct current (DC) field coil wound around at least one corresponding stator tooth. The stator includes an alternating current (AC) armature coil wound around at least one corresponding stator tooth. The DC field coil overlaps the AC armature coil along an arc length of the stator core.

DETAILED DESCRIPTION

Figure 1:
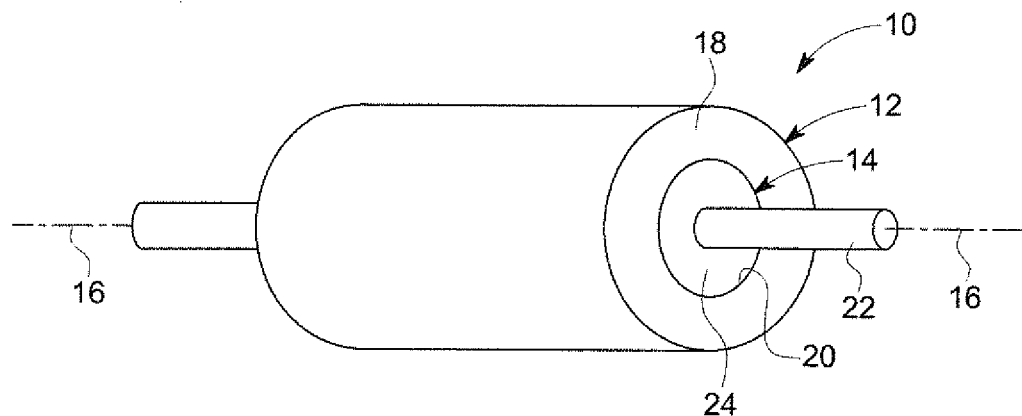
FIG. 1 is a perspective view of an embodiment of an electric machine.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide electric machines. At least one technical effect of the various embodiments is an electric machine having a higher power factor, and thus an increased energy conversion efficiency, as compared to at least some known electric machines, such as, but not limited to, switched reluctance machines (SRMs). At least one other technical effect of the various embodiments described and/or illustrated herein is an electric machine having more sinusoidal back electromotive force (EMF), a higher torque, smoother torque, a lower torque ripple, a simpler geometry, better mechanical integrity, a lower manufacturing costs, less noise and/or vibration, better voltage regulation, better controllability, and/or less windage losses as compared to at least some known electric machines, such as, but not limited to, SRMs.

The various embodiments may be implemented within electric machines, which include electric motors and electric generators. Applications of electric machines include, but are not limited to, automotive applications, aerospace applications, industrial applications, and/or the like.

FIG. 1 is a perspective view of an embodiment of an electric machine 10. The electric machine 10 includes a stator 12 and a rotor 14, which are concentrically aligned about a central longitudinal axis 16 of the electric machine 10. The rotor 14 is configured to rotate relative to the stator 12. The electric machine 10 may be an electrical motor, wherein the rotor 14 rotates relative to the stator 12 to convert electrical energy to mechanical energy. Alternatively, the electric machine 10 is an electrical generator, wherein the relative rotation between the rotor 14 and the stator 12 converts mechanical energy to electrical energy.

The stator 12 includes a stator core 18 that extends a length along the central longitudinal axis 16. The stator core 18 includes a central opening 20 that extends along the central longitudinal axis 16. The rotor 14 extends a length along the central longitudinal axis 16. The rotor 14 includes a shaft 22 and a rotor core 24 mounted to the shaft 22. The shaft 22 is configured to rotate about the central longitudinal axis 16. The rotor core 24 is mounted to the shaft 22 such that the rotor core 24 is configured to rotate about the central longitudinal axis 16 with the shaft 22.

In the illustrated embodiment of FIG. 1, the rotor core 24 extends along the central longitudinal axis 16 within the central opening 20 of the stator core 18. The rotor core 24 is configured to rotate about the central longitudinal axis 16. In other words, the stator core 18 of the electric machine 10 extends around the rotor core 24 such that the rotor core 24 rotates inside the stator 12. Alternatively, the rotor core 24 extends around the stator 12 such that the rotor core 24 is configured to rotate around the stator 12.

Figure 2:
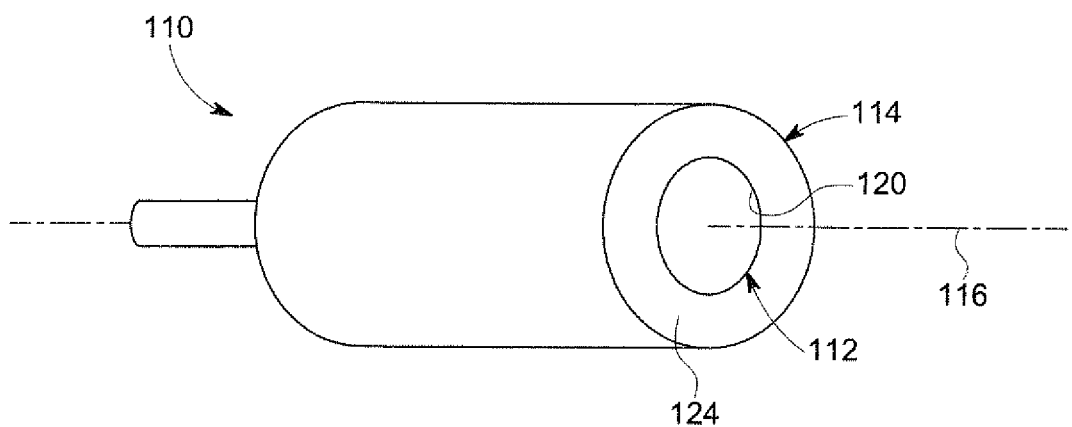
FIG. 2 is a perspective view of another embodiment of an electric machine.

For example, FIG. 2 is a perspective view of another embodiment of an electric machine 110. The electric machine 110 includes a stator 112 and a rotor 114, which are concentrically aligned about a central longitudinal axis 116. The rotor 114 rotates relative to the stator 112 to convert electrical energy to mechanical energy, or vice versa.

The stator 112 and rotor 114 extend lengths along a central longitudinal axis 116. The rotor 114 includes a rotor core 124 having a central opening 120 that extends along the central longitudinal axis 116. The stator 112 extends within the central opening 120 of the rotor core 124 such that the rotor core 124 extends around the stator 112. The rotor core 124 is configured to rotate about the central longitudinal axis 116 relative to the stator 112. In other words, the rotor core 124 is configured to rotate around the stator 112.

Figure 3:
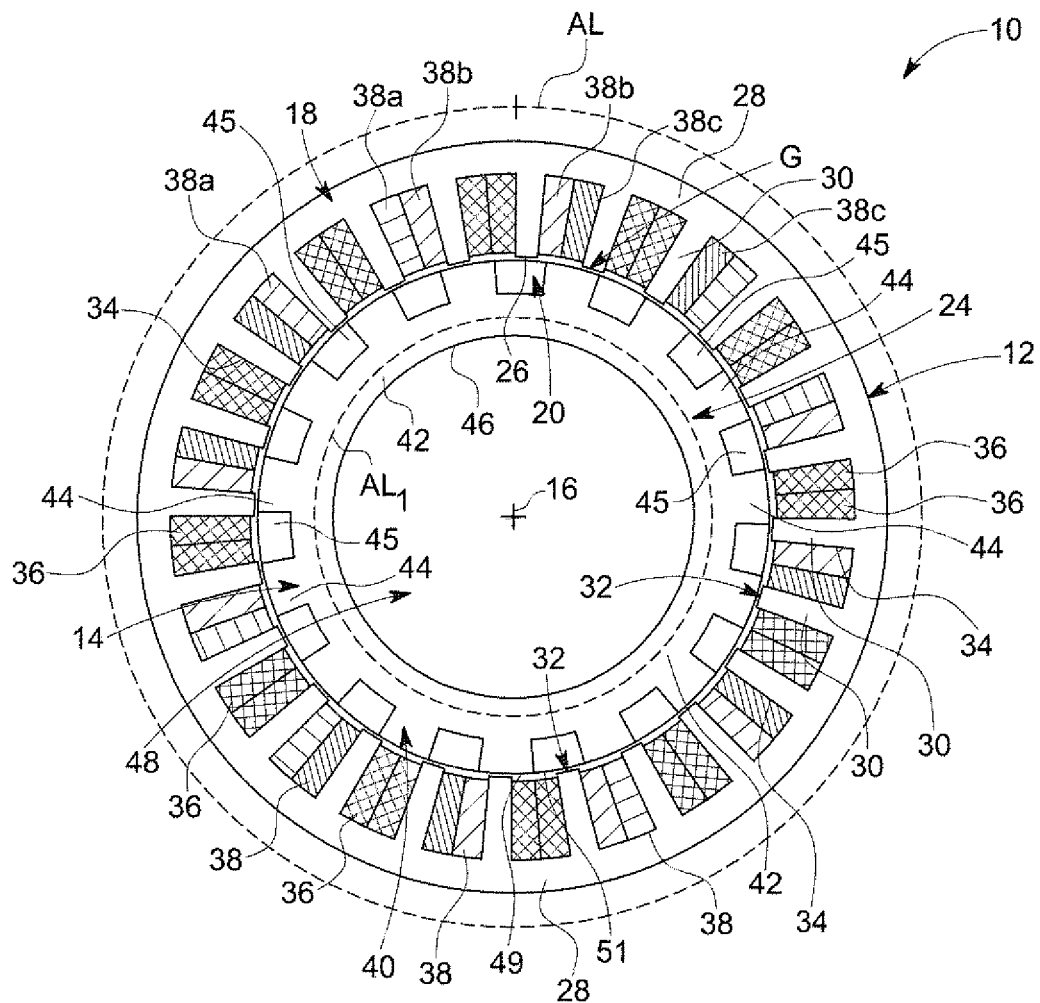
FIG. 3 is a cross-sectional view of the electric machine shown in FIG. 1.

FIG. 3 is a cross-sectional view of the electric machine 10. As described above, the electric machine 10 includes the stator 12 and the rotor 14. The stator 12 includes the stator core 18, which generates a magnetic field. The stator core 12 extends an arc length AL. A radially (relative to the central longitudinal axis 16) inner surface 26 of the stator core 18 defines the central opening 20 of the stator core 18.

In the illustrated embodiment of the stator 12, the stator core 18 includes a stator base 28 and a plurality of stator teeth 30 that extend radially (relative to the central longitudinal axis 16) from the stator base 28. The stator teeth 30 extend radially from the stator base 26 to ends 32 of the stator teeth 30. In the illustrated embodiment of the stator 12, the stator teeth 30 extend radially (relative to the central longitudinal axis 16) inward from the stator base 28. As can be seen in FIG. 3, the stator teeth 30 are arranged radially about the central longitudinal axis 16 such that the stator teeth 30 are spaced apart from each other along the arc length AL of the stator core 18. The stator core 18 includes stator slots 34 that extend between adjacent stator teeth 30 along the arc length AL of the stator core 18. In other words, the stator slots 34 are arranged with the stator teeth 30 in an alternating pattern of stator teeth 30 and stator slots 34 along the arc length AL of the stator core 18. The stator slots 34 extend radially (relative to the central longitudinal axis 16) from the stator base 28. In the illustrated embodiment of the stator 12, the stator slots 34 extend radially (relative to the central longitudinal axis 16) inward from the stator base 28. In some alternative embodiments, the ends 32 of adjacent stator teeth 30 are connected together.

The stator 12 includes both direct current (DC) field windings and alternating current (AC) armature windings. Specifically, the stator 12 includes both DC field coils 36 wound around corresponding stator teeth 30 and AC armature coils 38 wound around corresponding stator teeth 30. The DC field coils 36 are interleaved between the AC armature coils 38 along the arc length AL of the stator core 18. Specifically, the DC field coils 36 and the AC armature coils 38 are arranged alternately along the arc length AL of the stator core 18.

As will be described in more detail below, the DC field coils 36 may overlap the AC armature coils 38 along the arc length AL of the stator core 18. The AC armature coils 38 may be, or represent, any number of phases, such as, but not limited to, a single phase or three phases. In the illustrated embodiment of the electric machine 10, the AC armature coils 38 represent one or more sets of three-phase windings. Specifically, the AC armature coils 38 include first, second, and third phase AC armature coils 38a, 38b, and 38c, respectively. Each of the coils 36, 38a, 38b, and 38c is shown with a different cross-hatching in FIG. 3 for clarity.

The stator core 18 may include any number of stator teeth 30 and any number of stator slots 34. In the illustrated embodiment of the stator 12, the stator core 18 includes twenty four stator teeth 30 and twenty four stator slots 34. The stator core 18 may include any number of DC field coils 36 and any number of AC armature coils 38. When the stator 12 includes a plurality of phases of AC armature coils 38, the stator 12 may include any number of sets of the phases. For example, in the illustrated embodiment of the electric machine 10, the stator 12 includes four sets of three-phase windings, such that the stator 12 includes twelve AC armature coils 38.

The rotor 14 includes the shaft 22 (FIG. 1) and the rotor core 24. The shaft 22 is not shown in FIG. 3 for clarity. The rotor core 24 includes a body 40 that extends a length along the central longitudinal axis 16. The body 40 of the rotor core 24 extends an arc length $AL_1$. The body 40 is configured to rotate about the central longitudinal axis 16 relative to the stator 12. In the illustrated embodiment of the rotor 14, the body 40 includes a rotor base 42, a plurality of magnetic segments 44 that extend radially (relative to the central longitudinal axis 16) from the rotor base 42, and a plurality of non-magnetic segments 45 that extend radially (relative to the central longitudinal axis 16) from the rotor base 42. In the illustrated embodiment of the rotor 14, the segments 44 and 45 extend radially (relative to the central longitudinal axis 16) outward from the rotor base 42. The magnetic segments 44 and the non-magnetic segments 45 are arranged in an alternating pattern of magnetic segments 44 and non-magnetic segments 45 along the arc length $AL_1$ of the rotor core 24. In other words, the magnetic segments 44 are arranged radially about the central longitudinal axis 16 such that the magnetic segments 44 are spaced apart from each other along the arc length $AL_1$ of the rotor core 24, with the non-magnetic segments 45 extending between adjacent magnetic segments 45 along the arc length $AL_1$ of the rotor core 24. In the illustrated embodiment of the rotor 14, the rotor 14 is a toothed rotor wherein the magnetic segments 44 define rotor teeth 44 of the rotor core 24.

The rotor base 42 of the rotor core body 40 includes a radially (relative to the central longitudinal axis 16) inner surface 46 that defines a central opening 48 of the rotor core 24. The rotor core 24 includes a circumference defined by end surfaces 49 and 51 of the magnetic and non-magnetic segments 44 and 45, respectively. As can be seen in FIG. 3, the circumference of the rotor core 24 has an approximately constant radius of curvature along the arc length $AL_1$ of the rotor core 24. In other words, the end surfaces 49 and 51 have approximately the same radius as each other and are concentrically aligned along the central longitudinal axis 16 such that the circumference of the rotor core 24 is approximately smooth along the arc length $AL_1$ of the rotor core 24. An air gap G extends between the circumference of the rotor core 24 and the radially inner surface 26 of the stator core 18. The rotor base 42 may include one or more mortices (not shown) that are configured to receive corresponding tenons (not shown) of the shaft 22 therein for mounting the rotor core body 40 to the shaft 22. Other arrangements for mounting the rotor core body 40 to the shaft 22 may be provided in addition or alternative to the mortices and tenons.

The body 40 of the rotor core 24 may be formed from one or more stacks of a plurality of laminations. As an alternative to using one or more stacks of laminations, the rotor core body 40 may be formed as a single piece of material. The rotor base 42 of the rotor core body 40 may be integrally formed with the magnetic segments 44 and/or the non-magnetic segments 45 from a magnetic material. For example, when the body 40 of the rotor core 24 is formed from a stack of laminations, the rotor base 42 of each lamination, or layer, within the stack may be integrally formed with the magnetic segments 44 and/or the non-magnetic segments 45 of the lamination from a magnetic material. Moreover, and for example, in embodiments wherein the rotor core body 40 is formed as a single piece of material, the rotor base 42 is a single piece of material that is integrally formed with all of the magnetic segments 44 and non-magnetic segments 45 of the rotor core 24 from a magnetic material. In the illustrated embodiment of the rotor 14, the magnetic segments magnetically communicate with the rotor base 42 such that the rotor 14 is a toothed rotor. In other words, the rotor base 42 carries magnetic flux. The toothed rotor structure of the rotor 14, whether constructed of a stack of laminations or a single piece of material, distinguishes the rotor 14 from a "segmented" rotor 14 that includes a rotor core having magnetic segments that are magnetically isolated, or segmented, from the rotor base and each other. As in the illustrated embodiment of the electric machine 10, the stator 12 and/or the rotor 14 may not include a permanent magnet.

As will be described in more detail below, the magnetic segments 44 and the non-magnetic segments 45 may be integrally formed with each other from a magnetic material, with the non-magnetic segments 45 being rendered non-magnetic after being formed from the magnetic material. In other embodiments, and as will also be described below, the non-magnetic segments 45 are formed as discrete components relative to the magnetic segments 44.

The rotor core 24 may include any number of magnetic segments 44 and/or non-magnetic segments 45. For example, the rotor core 24 may include any number of rotor teeth 44. The rotor core 24 may include the same number of rotor teeth 44 as the number of stator teeth 30 that the stator core 18 includes. Alternatively, the stator core 18 may include a greater or a lesser number of stator teeth 30 than the number of rotor teeth 44 that the rotor core 24 includes. In the illustrated embodiment of the electric machine 10, the rotor core 24 includes fourteen rotor teeth 44, such that the illustrated embodiment of the electrical machine 10 includes a greater number of stator teeth 30 than rotor teeth 44.

In the illustrated embodiment of the electric machine 10, the electric machine 10 is what is commonly referred to as a "flux-switching machine (FSM)". Specifically, the DC field coils 36 create a change in the magnetic flux of the electric machine 10. As the rotor core 24 rotates relative to the stator core 18, excitation of the DC field coils 36 causes the magnitude and/or direction (i.e., polarity or sign) of the magnetic flux to vary as the magnetic flux links to subsequent AC armature coils 38. The DC field coils 36 thus cause the magnetic flux to "switch" during rotation of the rotor 14 relative to the stator 12. The electric machine 10 may be referred to herein as a "flux-switching electric machine". The electric machine 10 may be a synchronous electric machine.

Figure 4:
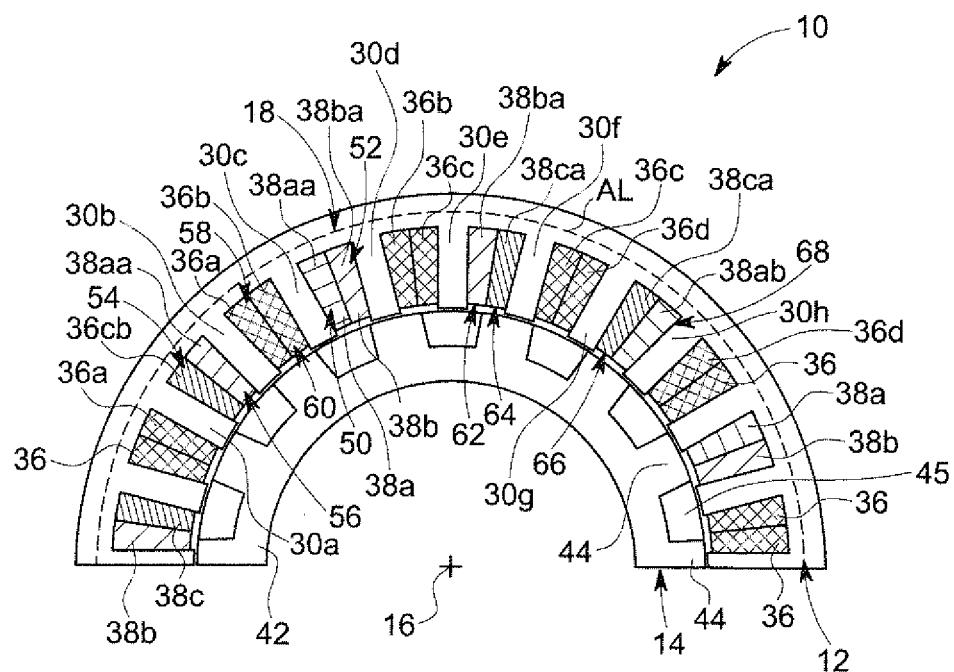
FIG. 4 is an enlarged cross-sectional view of a portion of the electric machine shown in FIGS. 1 and 3.
Figure 5:
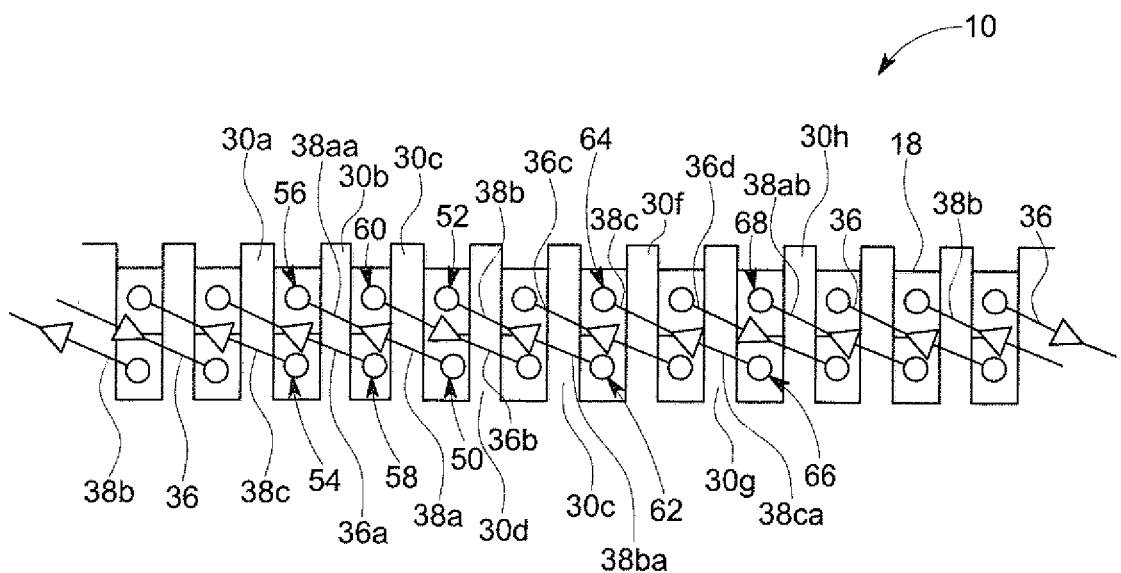
FIG. 5 is a schematic view of a portion of the electric machine shown in FIGS. 1, 3, and 4 illustrating a pattern of exemplary embodiments of direct current (DC) field coils and alternating current (AC) armature coils of the electric machine shown in FIGS. 1, 3, and 4.

FIG. 4 is an enlarged cross-sectional view of a portion of the electric machine 10. FIG. 5 is a schematic view of a portion of the electric machine 10 illustrating a pattern of the DC field coils 36 and the AC armature coils 38 along the arc length AL (not shown in FIG. 5) of the stator core 18. As briefly described above, within the pattern of the DC field coils 36 and the AC armature coils 38 along the arc length AL of the stator core 18, the DC field coils 36 may overlap the AC armature coils 38. For example, the DC field coils 36 include a DC field coil 36b and the AC armature coils 38 include AC armature coils 38aa and 38ba. In the illustrated embodiment of the electric machine 10, and as described above, the coils 38aa and 38ba are of different phases. But, the coils 38aa and 38ba may be of the same phase in other embodiments. The AC armature coils 38aa and 38ba include respective ends 50 and 52 that oppose each other along the arc length AL of the stator core 18. As can be seen in FIGS. 4 and 5, the DC field coil 36b overlaps both the end 50 of the AC armature coil 38aa and the end 52 of the AC armature coil 38ba.

As described above, in the illustrated embodiment of the electric machine 10, the AC armature coils 38 include four sets of first, second, and third phase AC armature coils 38a, 38b, and 38c, respectively. Each of the coils 36, 38a, 38b, and 38c is shown with a different cross-hatching in FIG. 4 for clarity. Only two sets of the first, second, and third phase AC armature coils 38a, 38b, and 38c, respectively, are shown in FIGS. 4 and 5 for clarity. Moreover, only the pattern of the DC field coils 36 and one of the sets of the first, second, and third phase AC armature coils 38a, 38b, and 38c, respectively, will be specifically described with reference to FIGS. 4 and 5. It should be understood that the DC field coils 36 and the sets of the first, second, and third phase AC armature coils 38a, 38b, and 38c, respectively, that are not shown in FIGS. 4 and 5 have the same pattern as the pattern of the DC field coils 36 and the sets of the first, second, and third phase AC armature coils 38a, 38b, and 38c, respectively, that is shown in FIGS. 4 and 5 and described below.

As can be seen in FIGS. 4 and 5, the DC field coils 36 are interleaved between the first, second, and third phase AC armature coils 38a, 38b, and 38c, respectively, along the arc length AL of the stator core 24 in an overlapping manner with the first, second, and third phase AC armature coils 38a, 38b, and 38c, respectively. Specifically, the stator teeth 30 of the stator core 24 include stator teeth 30a, 30b, 30c, 30d, 30e, 30f, 30g, and 30h, which are consecutively arranged along the arc length AL of the stator core 18. In other words, the stator teeth 30a and 30b are positioned adjacent each other along the arc length AL of the stator core 18, stator teeth 30b and 30c are positioned adjacent each other, and so forth. The first phase AC armature coil 38aa is wound around the stator teeth 30b and 30c. The second phase AC armature coil 38ba is wrapped around the stator teeth 30d and 30e, while a third phase AC armature coil 38ca is wrapped around the stator teeth 30f and 30g. Although each AC armature coil 38 is shown as being wound around two corresponding stator teeth 30, each AC armature coil 38 may be wound around any number of corresponding stator teeth 30, for example to provide a predetermined amount of overlap of a DC field coil 36 and an AC armature coil 38.

A DC field coil 36a is wound around the stator teeth 30a and 30b. The DC field coil 36a overlaps an end 54 of a third phase AC armature coil 38cb and overlaps an end 56 of the first phase AC armature coil 38aa along the arc length AL of the stator core 18. As can be seen in FIG. 4, the end 54 of the third phase AC armature coil 38cb extends within the same stator slot 34a as the end 56 of the first phase AC armature coil 38aa. The ends 54 and 56 oppose each other within the stator slot 34a.

The DC field coil 36b is wound around the stator teeth 30c and 30d. The DC field coil 36b overlaps the end 50 of the first phase AC armature coil 38aa along the arc length AL of the stator core 18. The DC field coil 36b also overlaps the end 52 of the second phase AC armature coil 38ba along the arc length AL of the stator core 18. As can be seen in FIG. 4, an end 58 of the DC field coil 36a extends within the same stator slot 34b as an end 60 of the DC field coil 36b. The ends 58 and 60 oppose each other within the stator slot 34b.

A DC field coil 36c is wound around the stator teeth 30e and 30f. The DC field coil 36c overlaps an end 62 of the second phase AC armature coil 36ba along the arc length AL of the stator core 18. The DC field coil 36c also overlaps an end 64 of a third phase AC armature coil 36ca along the arc length AL of the stator core 18. A DC field coil 36d is wound around the stator teeth 30g and 30h. The DC field coil 36d overlaps an end 66 of the third phase AC armature coil 36ca along the arc length AL of the stator core 18. The DC field coil 36d also overlaps an end 68 of a first phase AC armature coil 36ab along the arc length AL of the stator core 18.

Although each DC field coil 36 is shown as being wound around two corresponding stator teeth 30, each DC field coil 36 may be wound around any number of corresponding stator teeth 30, for example to provide a predetermined amount of overlap of a DC field coil 36 and an AC armature coil 38. Each DC field coil 36 may overlap the corresponding AC armature coil(s) 36 by any amount, which may be selected to provide the electric machine 10 with one or more electrical and/or mechanical properties.

Referring now solely to FIG. 4, in the illustrated embodiment of the rotor 14, the magnetic segments 44 and the non-magnetic segments 45 are integrally formed with each other and the rotor base 42 from a magnetic material. The non-magnetic segments 45 are then rendered non-magnetic after being formed from the magnetic material to form the pattern of magnetic and non-magnetic segments 44 and 45, respectively. Once the non-magnetic segments 45 have been rendered non-magnetic, the material of the rotor core 42 may be referred to as a "bi-state material". The non-magnetic segments 45 may be rendered non-magnetic using any method, means, process, structure, and/or the like, such as, but not limited to, using a laser and/or the like. In some alternative embodiments, the magnetic segments 44 and the non-magnetic segments 45 are integrally formed with each other and the rotor base 42 from a non-magnetic material, with the magnetic segments 44 (and optionally the rotor base 42, for example if the rotor is a toothed rotor) being magnetized thereafter.

Figure 6:
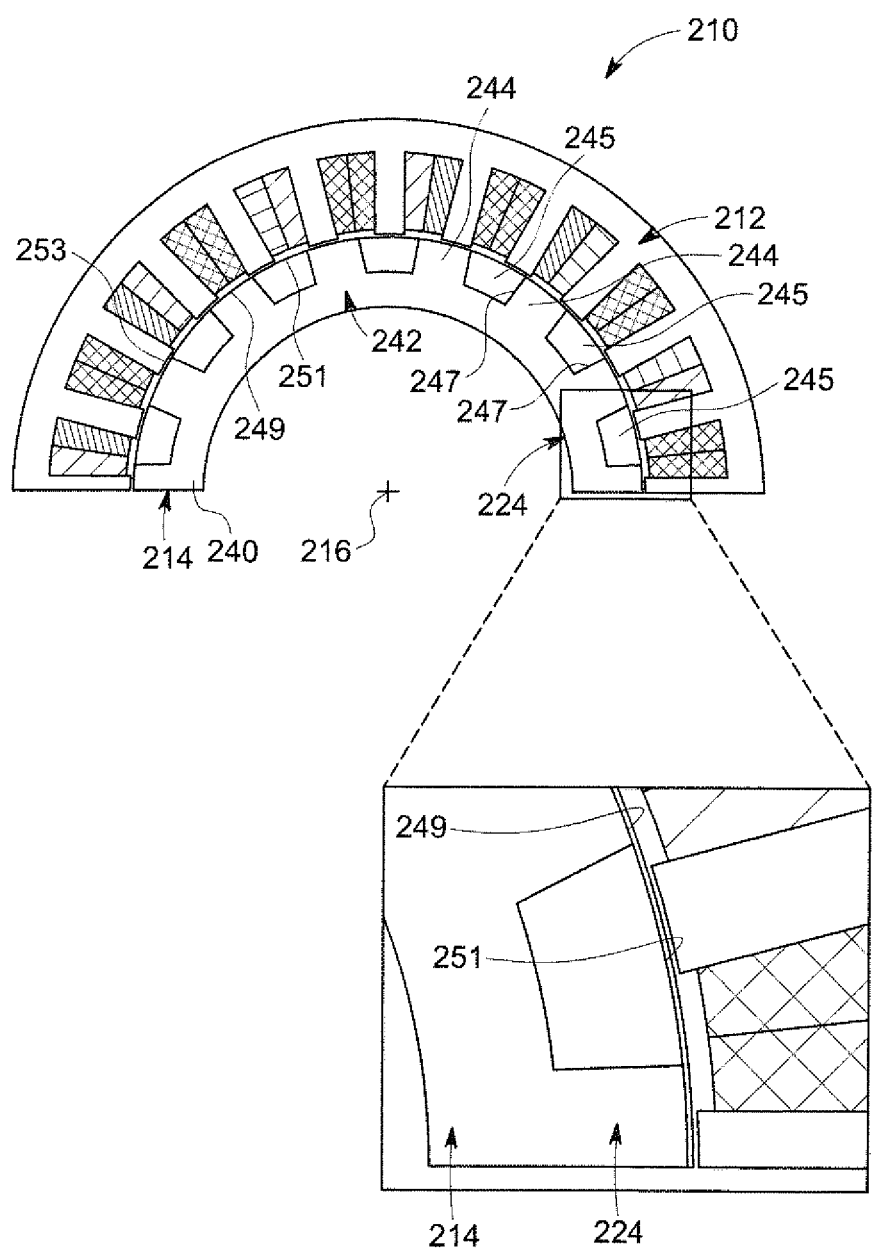
FIG. 6 is an enlarged cross-sectional view of a portion of another embodiment of an electric machine.

As described above, instead of forming a bi-state material, the non-magnetic segments 45 may be formed as discrete components relative to the magnetic segments 44. FIG. 6 is an enlarged cross-sectional view of a portion of another embodiment of an electric machine 210. The electric machine 210 includes a stator 212 and a rotor 214. The rotor 214 includes a rotor core 224 having a body 240. The body 240 includes a rotor base 242, a plurality of magnetic segments 244 that extend radially (relative to a central longitudinal axis 216) from the rotor base 242, and a plurality of non-magnetic segments 245 that extend radially (relative to the central longitudinal axis 216) from the rotor base 242. The magnetic segments 244 and the non-magnetic segments 245 are arranged in an alternating pattern of magnetic segments 244 and non-magnetic segments 245 along an arc length of the rotor core 224. In the illustrated embodiment of the rotor 214, the rotor 214 is a toothed rotor wherein the magnetic segments 244 define rotor teeth 244 of the rotor core 224.

The non-magnetic segments 245 are formed as discrete components relative to the magnetic segments 244. For example, the rotor core 224 includes rotor slots 247 that extend between adjacent magnetic segments 244 along the arc length of the rotor core 224. The rotor slots 247 are arranged with the magnetic segments 244 in an alternating pattern of magnetic segments 244 and rotor slots 247 along the arc length of the rotor core 224. The rotor slots 247 extend radially (relative to the central longitudinal axis 216) from the rotor base 242. In the illustrated embodiment of the rotor 214, the rotor slots 247 extend radially (relative to the central longitudinal axis 216) outward from the rotor base 242. The non-magnetic segments 245 are filler material that fill the rotor slots 247. In other words, the non-magnetic segments 245 extend within the rotor slots 247 and fill the spaces defined by the rotor slots 247 between adjacent magnetic segments 244. The filler material used to form the non-magnetic segments 245 may be any non-magnetic material.

The rotor core 224 includes a circumference defined by end surfaces 249 and 251 of the magnetic and non-magnetic segments 244 and 245, respectively. As can be seen in FIG. 6, the circumference of the rotor core 224 has an approximately constant radius of curvature along the arc length of the rotor core 224 such that the circumference is approximately smooth along the arc length of the rotor core 224.

Optionally, a rotor sleeve 253 extends around the circumference of the rotor core 224. The rotor sleeve 253 may facilitate holding the filler material of the non-magnetic segments 245 within the rotor slots 247. As should be apparent from FIG. 6, the rotor sleeve 253 may provide the rotor core 224 with an approximately smooth circumference along the arc length of the rotor core. In some embodiments that include the rotor sleeve 253, the filler material used to form the non-magnetic segments 245 is air and/or another fluid.

The rotor sleeve 253 may be non-magnetic, non-electrically conductive, or may have a reduced electrical conductivity as compared to other components of the rotor 214. When the rotor sleeve 253 is included, an air gap may be defined between the rotor sleeve 253 and a radially inner surface 226 of the stator 212. When the rotor sleeve 253 is not included, an air gap may extend between the circumference of the rotor core 224 and the radially inner surface 226 of the stator 212.

In the illustrated embodiment of the electric machine 210, the electric machine 210 is what is commonly referred to as an "FSM". The electric machine 210 may be referred to herein as a "flux-switching electric machine". The electric machine 210 may be a synchronous electric machine.

Figure 7:
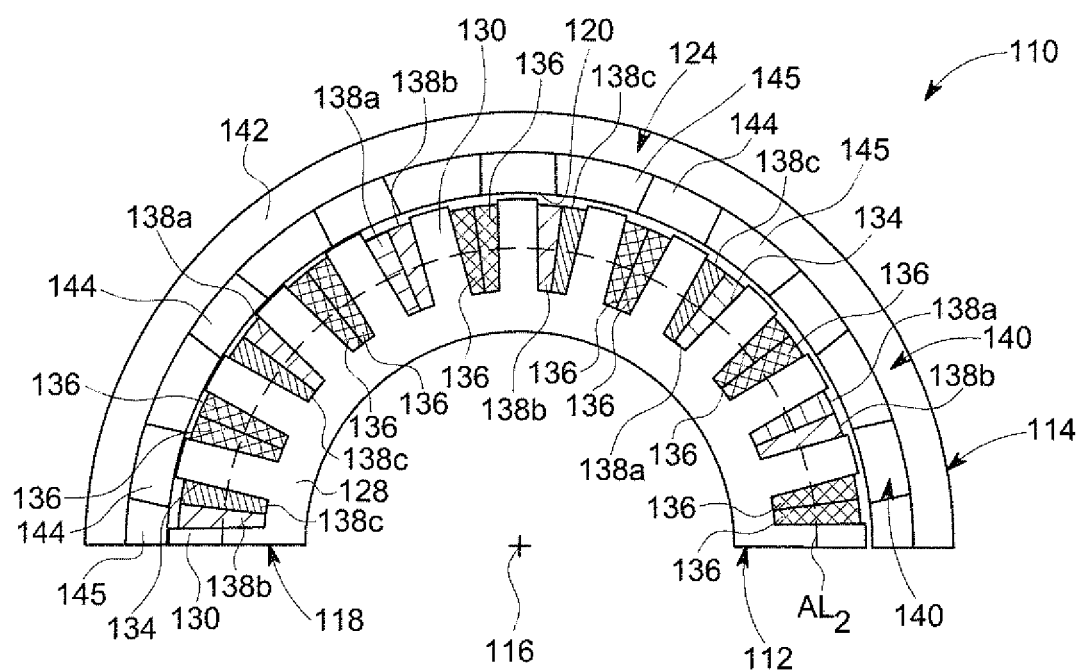
FIG. 7 is an enlarged cross-sectional view of a portion of the electric machine shown in FIG. 2.

FIG. 7 is an enlarged cross-sectional view of a portion of the electric machine 110. As described above, the electric machine 110 includes the stator 112 and the rotor 114. The stator 112 includes a stator core 118, which generates a magnetic field and extends along an arc length $AL_2$. The rotor 114 includes the rotor core 124, which has the central opening 120. The stator core 118 extends within the central opening 120 of the rotor core 124 such that the rotor core 124 extends around the stator 112. The rotor core 124 is configured to rotate about the central longitudinal axis 116 relative to the stator core 118. In other words, the rotor core 124 is configured to rotate around the stator core 118.

The rotor core 124 includes a body 140 that extends a length along the central longitudinal axis 116. The body 140 includes a rotor base 142, a plurality of magnetic segments 144 that extend radially (relative to the central longitudinal axis 116) inward from the rotor base 142, and a plurality of non-magnetic segments 145 that extend radially (relative to the central longitudinal axis 116) inward from the rotor base 142. In the illustrated embodiment of the rotor 114, the rotor 114 is a toothed rotor wherein the magnetic segments 144 define rotor teeth 144 of the rotor core 124. The rotor core 124 includes a circumference that, as can be seen in FIG. 7, has an approximately constant radius of curvature along the arc length of the rotor core 124 such that the circumference is approximately smooth along the arc length of the rotor core 124.

The stator core 118 includes a stator base 128 and a plurality of stator teeth 130 that extend radially (relative to the central longitudinal axis 116) outward from the stator base 128. The stator core 118 includes stator slots 134 that extend between adjacent stator teeth 130 along the arc length $AL_2$ of the stator core 118.

The stator 112 includes both DC field coils 136 wound around corresponding stator teeth 130 and AC armature coils 138 wound around corresponding stator teeth 130. The AC armature coils 138 may be, or represent, any number of phases, such as, but not limited to, a single phase or three phases. In the illustrated embodiment of the electric machine 110, the AC armature coils 138 include first, second, and third phase AC armature coils 138a, 138b, and 138c, respectively. Each of the coils 136, 138a, 138b, and 138c is shown with a different cross-hatching in FIG. 6 for clarity.

The DC field coils 136 are interleaved between the first, second, and third phase AC armature coils 138a, 138b, and 138c, respectively, along the arc length $AL_2$ of the stator core 124 in an overlapping manner with the first, second, and third phase AC armature coils 138a, 138b, and 138c, respectively. In the illustrated embodiment of the electric machine 110, the overlapping and interleaved pattern of the DC field coils 136 and the AC armature coils 138a, 138b, and 138c is the same pattern as the overlapping and interleaved pattern of the DC field coils 36 and the AC armature coils 38a, 38b, and 38c shown in FIGS. 3-5. Accordingly, the overlapping and interleaved pattern of the DC field coils 136 and the AC armature coils 138a, 138b, and 138c will not be described in more detail herein.

In the illustrated embodiment of the electric machine 110, the electric machine 110 is what is commonly referred to as an "FSM". The electric machine 110 may be referred to herein as a "flux-switching electric machine". The electric machine 110 may be a synchronous electric machine.

Figure 8:
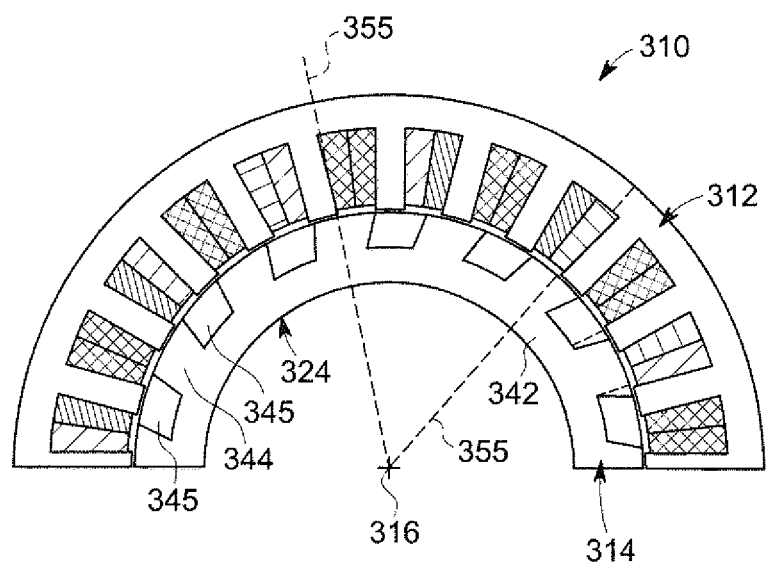
FIG. 8 is an enlarged cross-sectional view of a portion of another embodiment of an electrical machine.

FIG. 8 is an enlarged cross-sectional view of a portion of another embodiment of an electric machine 310. The electric machine 310 includes a stator 312 and a rotor 314. The rotor 314 includes a rotor core 324 having a rotor base 342, a plurality of magnetic segments 344 that extend radially (relative to a central longitudinal axis 316) from the rotor base 342, and a plurality of non-magnetic segments 345 that extend radially (relative to the central longitudinal axis 316) from the rotor base 342. The magnetic segments 344 and the non-magnetic segments 345 are arranged in an alternating pattern of magnetic segments 344 and non-magnetic segments 345 along an arc length of the rotor core 324. In the illustrated embodiment of the rotor 314, the rotor 314 is a toothed rotor wherein the magnetic segments 344 define rotor teeth 344 of the rotor core 324.

The magnetic segments 344 extend radially relative to the central longitudinal axis 316 along central radial axes 355 that intersect the central longitudinal axis 316. Only two of the central radial axes 355 have been drawn in FIG. 8 for clarity. As can be seen in FIG. 8, each magnetic segment 344 has a shape that is asymmetrical about the corresponding central radial axis 355. Each magnetic segment 344 may have any shape that is asymmetrical about the corresponding central radial axis 355. The asymmetrical shapes about the central axes 355 may be selected to provide a rotor pole shape that increases output torque of the electric machine 310 under load conditions.

In the illustrated embodiment of the electric machine 310, the electric machine 310 is what is commonly referred to as an "FSM". The electric machine 310 may be referred to herein as a "flux-switching electric machine". The electric machine 310 may be a synchronous electric machine.

Figure 9:
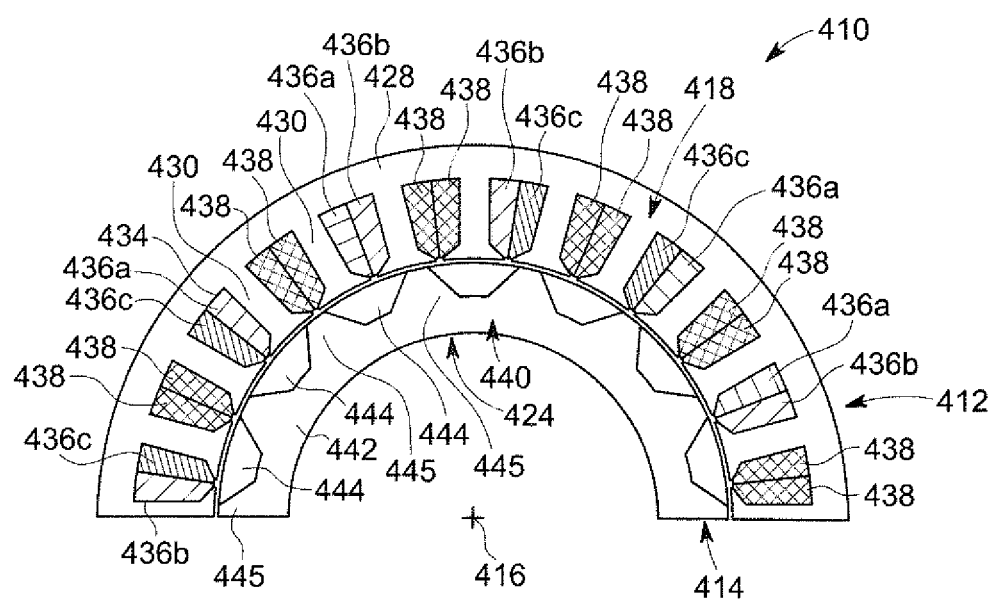
FIG. 9 is an enlarged cross-sectional view of a portion of another embodiment of an electrical machine.

FIG. 9 is an enlarged cross-sectional view of a portion of another embodiment of an electric machine 410. FIG. 9 illustrates a segmented rotor 414. The electric machine 410 includes a stator 412 and the rotor 414. The stator 412 includes a stator core 418 having a stator base 428 and stator teeth 430 that extend radially (relative to a central longitudinal axis 416) from the stator base 428. The stator core 418 includes stator slots 434 that extend between adjacent stator teeth 430 along an arc length of the stator core 418.

The stator 412 includes both DC field coils 436 wound around corresponding stator teeth 430 and AC armature coils 438 wound around corresponding stator teeth 430. The AC armature coils 438 may be, or represent, any number of phases, such as, but not limited to, a single phase or three phases. In the illustrated embodiment of the electric machine 410, the AC armature coils 438 include first, second, and third phase AC armature coils 438a, 438b, and 438c, respectively. Each of the coils 436, 438a, 438b, and 438c is shown with a different cross-hatching in FIG. 9 for clarity.

The DC field coils 436 are interleaved between the first, second, and third phase AC armature coils 438a, 438b, and 438c, respectively, along the arc length of the stator core 424 in an overlapping manner with the first, second, and third phase AC armature coils 438a, 438b, and 438c, respectively. In the illustrated embodiment of the electric machine 410, the overlapping and interleaved pattern of the DC field coils 436 and the AC armature coils 438a, 438b, and 438c is the same pattern as the overlapping and interleaved pattern of the DC field coils 36 and the AC armature coils 38a, 38b, and 38c shown in FIGS. 3-5. Accordingly, the overlapping and interleaved pattern of the DC field coils 436 and the AC armature coils 438a, 438b, and 438c will not be described in more detail herein.

The rotor 414 includes a rotor core 424 having a body 440 that includes a rotor base 442, a plurality of magnetic segments 444 that extend radially (relative to a central longitudinal axis 416) from the rotor base 442, and a plurality of non-magnetic segments 445 that extend radially (relative to the central longitudinal axis 416) from the rotor base 442. The magnetic segments 444 and the non-magnetic segments 445 are arranged in an alternating pattern of magnetic segments 444 and non-magnetic segments 445 along an arc length of the rotor core 424. As can be seen in FIG. 9, the rotor core 424 includes a circumference that has an approximately constant radius of curvature along the arc length of the rotor core 424 such that the circumference is approximately smooth along the arc length of the rotor core 424.

In the illustrated embodiment of the rotor 414, the rotor 414 is a segmented rotor 414 having a segmented rotor core 424. Specifically, the magnetic segments 444 are magnetically isolated, or segmented, from the rotor base 442 and each other. In other words, the rotor base 442 does not carry magnetic flux.

The body 440 of the rotor core 424 may be formed from one or more stacks of a plurality of laminations. As an alternative to using one or more stacks of laminations, the rotor core body 440 may be formed as a single piece of material. The rotor base 442 of the rotor core body 440 may be integrally formed with the magnetic segments 444 and/or the non-magnetic segments 445 from a magnetic material. For example, when the body 440 of the rotor core 424 is formed from a stack of laminations, the rotor base 442 of each lamination, or layer, within the stack may be integrally formed with the magnetic segments 444 and/or the non-magnetic segments 445 of the lamination from a magnetic material. Moreover, and for example, in embodiments wherein the rotor core body 440 is formed as a single piece of material, the rotor base 442 is a single piece of material that is integrally formed with all of the magnetic segments 444 and non-magnetic segments 445 of the rotor core 424 from a magnetic material. The stator 412 and/or the rotor 414 may not include a permanent magnet.

In the illustrated embodiment of the rotor 414, the magnetic segments 444 and the non-magnetic segments 445 are integrally formed with each other and the rotor base 442 from a magnetic material. The non-magnetic segments 445 and the rotor base 442 are then rendered non-magnetic after being formed from the magnetic material. Once the non-magnetic segments 445 and the rotor base 442 have been rendered non-magnetic, the material of the rotor core 442 may be referred to as a "bi-state material". The non-magnetic segments 445 and the rotor base 442 may be rendered non-magnetic using any method, means, process, structure, and/or the like, such as, but not limited to, using a laser and/or the like. In some alternative embodiments, the magnetic segments 444 and the non-magnetic segments 445 are integrally formed with each other and the rotor base 442 from a non-magnetic material, with the magnetic segments 444 being magnetized thereafter.

In the illustrated embodiment of the electric machine 410, the electric machine 410 is what is commonly referred to as an "FSM". The electric machine 410 may be referred to herein as a "flux-switching electric machine". The electric machine 410 may be a synchronous electric machine.

Figure 10:
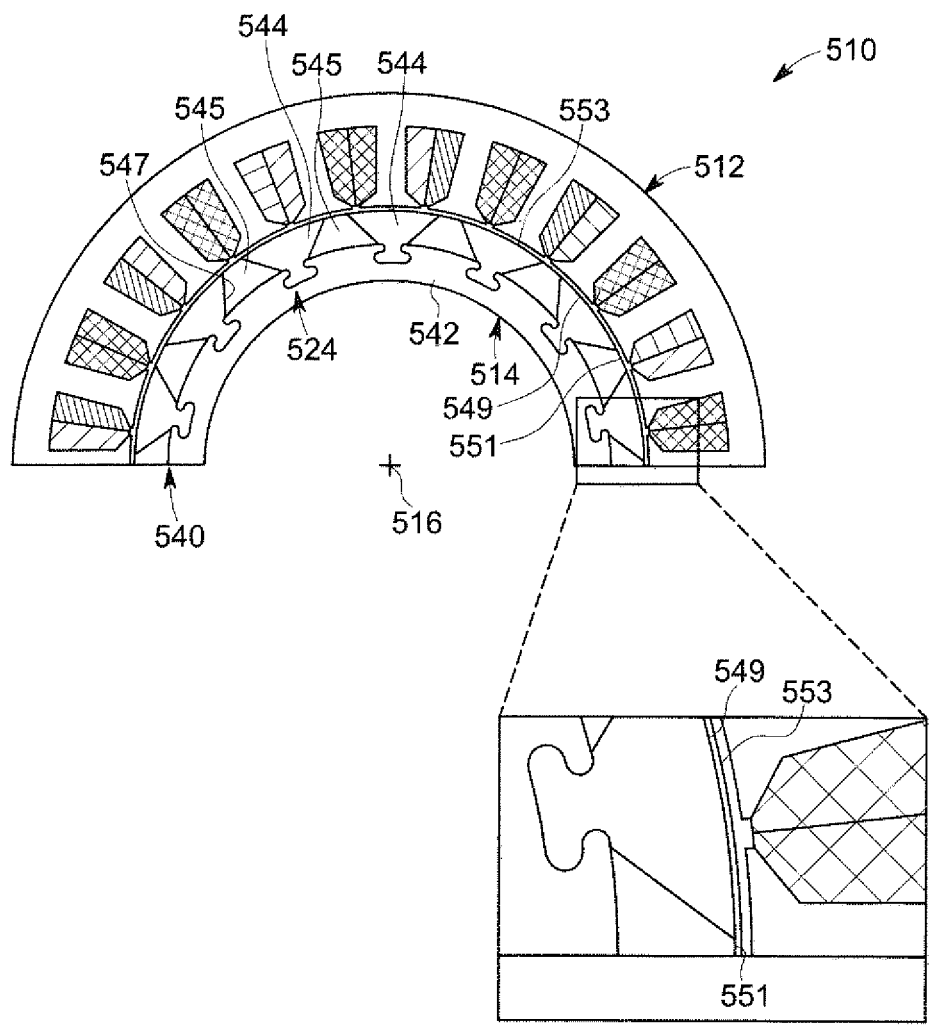
FIG. 10 is an enlarged cross-sectional view of a portion of another embodiment of an electrical machine.

FIG. 10 is an enlarged cross-sectional view of a portion of another embodiment of an electric machine 510. The electric machine 510 includes a stator 512 and a rotor 514. The rotor 514 includes a rotor core 524 having a body 540. The body 540 includes a rotor base 542, a plurality of magnetic segments 544 that extend radially (relative to a central longitudinal axis 516) from the rotor base 542, and a plurality of non-magnetic segments 545 that extend radially (relative to the central longitudinal axis 516) from the rotor base 542. The magnetic segments 544 and the non-magnetic segments 545 are arranged in an alternating pattern of magnetic segments 544 and non-magnetic segments 545 along an arc length of the rotor core 524. In the illustrated embodiment of the rotor 514, the rotor 514 is a segmented rotor wherein the magnetic segments 544 are magnetically isolated from the rotor base 542 and each other.

The non-magnetic segments 545 are formed as discrete components relative to the magnetic segments 544. For example, the rotor core 524 includes rotor slots 547 that extend between adjacent magnetic segments 544 along the arc length of the rotor core 524. The rotor slots 547 are arranged with the magnetic segments 544 in an alternating pattern of magnetic segments 544 and rotor slots 547 along the arc length of the rotor core 524. The rotor slots 547 extend radially (relative to the central longitudinal axis 516) from the rotor base 542. In the illustrated embodiment of the rotor 514, the rotor slots 547 extend radially (relative to the central longitudinal axis 516) outward from the rotor base 542. The non-magnetic segments 545 are filler material that fill the rotor slots 547. In other words, the non-magnetic segments 545 extend within the rotor slots 547 and fill the spaces defined by the rotor slots 547 between adjacent magnetic segments 544. The filler material used to form the non-magnetic segments 545 may be any non-magnetic material.

The rotor core 524 includes a circumference defined by end surfaces 549 and 551 of the magnetic and non-magnetic segments 544 and 545, respectively. As can be seen in FIG. 10, the circumference of the rotor core 524 has an approximately constant radius of curvature along the arc length of the rotor core 524 such that the circumference is approximately smooth along the arc length of the rotor core 524.

Optionally, a rotor sleeve 553 extends around the circumference of the rotor core 524. The rotor sleeve 553 may facilitate holding the filler material of the non-magnetic segments 545 within the rotor slots 547. The rotor sleeve 553 may provide the rotor core 524 with an approximately smooth circumference along the arc length of the rotor core. In some embodiments that include the rotor sleeve 553, the filler material used to form the non-magnetic segments 545 is air and/or another fluid.

The rotor sleeve 553 may be non-magnetic, non-electrically conductive, or may have a reduced electrical conductivity as compared to other components of the rotor 514. When the rotor sleeve 553 is included, an air gap may be defined between the rotor sleeve 553 and a radially inner surface 526 of the stator 512. When the rotor sleeve 553 is not included, an air gap may extend between the circumference of the rotor core 524 and the radially inner surface 526 of the stator 512.

In the illustrated embodiment of the electric machine 510, the electric machine 510 is what is commonly referred to as an "FSM". The electric machine 510 may be referred to herein as a "flux-switching electric machine". The electric machine 510 may be a synchronous electric machine.

Figure 11:
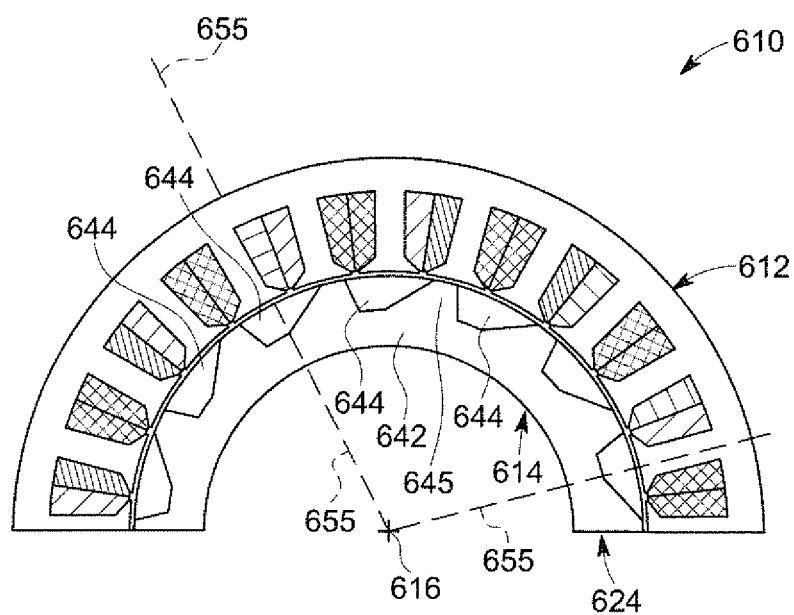
FIG. 11 is an enlarged cross-sectional view of a portion of another embodiment of an electrical machine.

FIG. 11 is an enlarged cross-sectional view of a portion of another embodiment of an electric machine 610. The electric machine 610 includes a stator 612 and a rotor 614. The rotor 614 includes a rotor core 624 having a rotor base 642, a plurality of magnetic segments 644 that extend radially (relative to a central longitudinal axis 616) from the rotor base 642, and a plurality of non-magnetic segments 645 that extend radially (relative to the central longitudinal axis 616) from the rotor base 642. The magnetic segments 644 and the non-magnetic segments 645 are arranged in an alternating pattern of magnetic segments 644 and non-magnetic segments 645 along an arc length of the rotor core 624. In the illustrated embodiment of the rotor 614, the rotor 614 is a segmented rotor wherein the magnetic segments 644 are magnetically isolated from the rotor base 642 and each other.

The magnetic segments 644 extend radially relative to the central longitudinal axis 616 along central radial axes 655 that intersect the central longitudinal axis 616. Only two of the central radial axes 655 have been drawn in FIG. 11 for clarity. As can be seen in FIG. 11, each magnetic segment 644 has a shape that is asymmetrical about the corresponding central radial axis 655. Each magnetic segment 644 may have any shape that is asymmetrical about the corresponding central radial axis 655. The asymmetrical shapes about the central axes 655 may be selected to provide a rotor pole shape that increases output torque of the electric machine 610 under load conditions.

In the illustrated embodiment of the electric machine 610, the electric machine 610 is what is commonly referred to as an "FSM". The electric machine 610 may be referred to herein as a "flux-switching electric machine". The electric machine 610 may be a synchronous electric machine.

The various embodiments described and/or illustrated herein may provide an electric machine having a higher power factor, and thus an increased energy conversion efficiency, as compared to at least some known electric machines, such as, but not limited to, SRMs. The various embodiments described and/or illustrated herein may provide an electric machine having more sinusoidal back electromotive force (EMF), a higher torque, smoother torque, a lower torque ripple, a simpler geometry, better mechanical integrity, a lower manufacturing cost, less noise and/or vibration, better voltage regulation, better controllability, and/or less windage losses as compared to at least some known electric machines, such as, but not limited to, SRMs.

Figure 12:
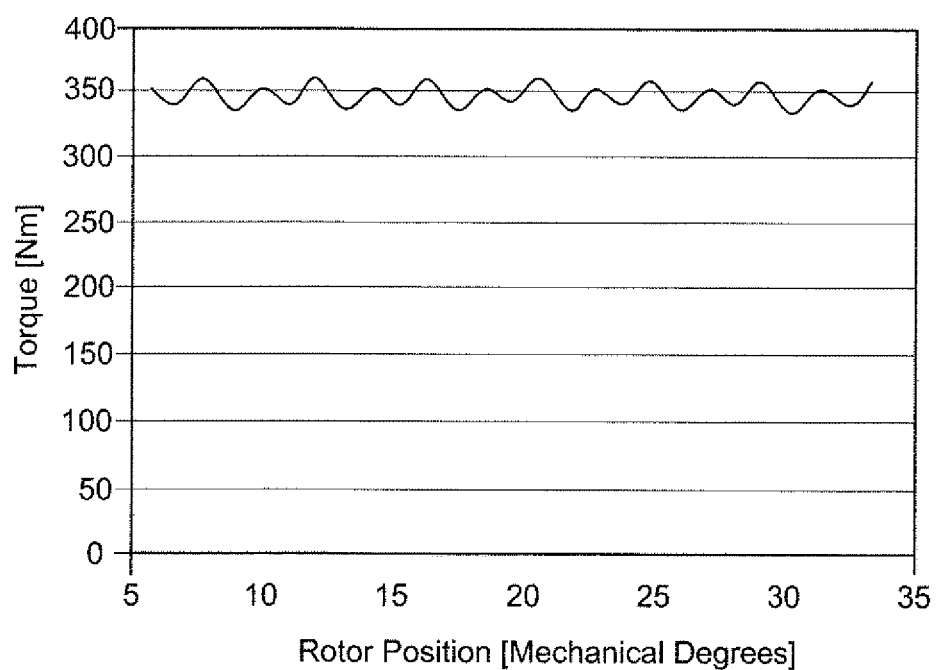
FIG. 12 is a graph illustrating an exemplary torque of the electric machine shown in FIGS. 2 and 7.

For example, FIG. 12 is a graph illustrating a torque of the electric machine 110 shown in FIGS. 2 and 7. The rotor core 124 (FIGS. 2 and 7) of the electric machine 110 includes fourteen rotor teeth 144 (FIG. 7), while the stator core 118 (FIG. 7) includes twenty four stator teeth 130. The stator 112 (FIGS. 2 and 7) includes four sets of three-phase windings. As can be seen in FIG. 12, the rotor 114 (FIGS. 2 and 7) of the electric machine 110 generates a torque of between approximately 325 Nm and approximately 375 Nm at various angular positions of the rotor 114. As should also be apparent from FIG. 12, the torque generated by the rotor 114 remains generally within a relatively small range (such as, but not limited to, a range of approximately 50 Nm) as the rotor 114 rotates along the various angular positions of the rotor 114. The relatively small range may enable the rotor 114 to generate a smoother torque than at least some known electric machines, such as, but not limited to, SRMs and/or electric machines having segmented rotors.

The various embodiments described and/or illustrated herein may provide an electric machine having the robustness of an SRM with the relatively high quality of operation of a synchronous electric machine. For example, the electric machine of the various embodiments may have a relatively robust (e.g., mechanically, electrically, and/or thermally), relatively simple, relatively cost effective, and/or relatively reliable structure and/or construction. The electric machines of the various embodiments may be suitable for use under relatively harsh and/or relatively extreme operating conditions. For example, the electric machines of the various embodiments may be suitable for use in relatively harsh and/or relatively extreme environments wherein the electric machine is exposed to relatively high temperatures, relatively low temperatures, moisture, chemicals, dust, abrasive materials, and/or the like. The various embodiments described and/or illustrated herein may provide an electric machine having the quality of operation of a synchronous electric machine. The electric machines of the various embodiments may have a stator and/or a rotor that does not include any permanent magnets. The various embodiments described and/or illustrated herein may provide an electric machine having a rotor that includes built-in saliency.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A machine comprising:
   a rotor comprising a rotor core configured to rotate about a central longitudinal axis, the rotor core having an outer circumference extending along an arc length of the rotor core, the rotor core including magnetic segments and non-magnetic segments arranged in an alternating pattern along the arc length of the rotor core, wherein each of the magnetic segments has a shape that is asymmetric about all radial axes of the rotor core that radially extend outward from the central longitudinal axis; and
   a stator comprising a stator core extending along an arc length and along the central longitudinal axis, the stator core comprising a stator base and stator teeth that radially extend from the stator base relative to the central longitudinal axis, the stator comprising a direct current (DC) field coil wound around at least one corresponding stator tooth of the stator teeth, the stator comprising an alternating current (AC) armature coil wound around at least one corresponding stator tooth of the stator teeth, wherein the DC field coil overlaps the AC armature coil along the arc length of the stator core.

2. The machine of claim 1, wherein the stator comprises a plurality of the DC field coils, the AC armature coil comprises a first phase AC armature coil, and the stator comprises a second phase AC armature coil, and a third phase AC armature coil, the first, second, and third AC armature coils representing a set of three-phase windings, the plurality of the DC field coils being interleaved between the first, second, and third phase AC armature coils along the arc length of the stator core in an overlapping manner with the first, second, and third phase AC armature coils.

3. The machine of claim 1, wherein the DC field coil is a first DC field coil and the stator includes second, third, and fourth DC field coils, the AC armature coil is a first phase AC armature coil and the stator includes second and third phase AC armature coils, and the stator teeth comprise first, second, third, fourth, fifth, sixth, seventh, and eighth stator teeth arranged along the arc length of the stator core, the first phase AC armature coil being wound around the second and third stator teeth, the second phase AC armature coil being wound around the fourth and fifth stator teeth, the third phase AC armature coil being wound around the sixth and seventh stator teeth, the first DC field coil being wound around the first and second stator teeth and overlapping the first phase AC armature coil, the second DC field coil being wound around the third and fourth stator teeth and overlapping the first and second phase AC armature coils, the third DC field coil being wound around the fifth and sixth stator teeth and overlapping the second and third phase AC armature coils, the fourth DC field coil being wound around the seventh and eighth stator teeth and overlapping the third phase AC armature coil.

4. The machine of claim 1, wherein the AC armature coil is a first phase AC armature coil and the stator includes a second phase AC armature coil, the first phase AC armature coil comprising a first end that opposes a second end of the second phase AC armature coil, the DC armature coil overlapping the first end of the first phase AC armature coil along the arc length of the stator core, the DC armature coil overlapping the second end of the second phase AC armature coil along the arc length of the stator core.

5. The machine of claim 1, wherein the magnetic and non-magnetic segments of the rotor core are integrally formed with each other from a magnetic material, the non-magnetic segments being rendered non-magnetic after being formed from the magnetic material.

6. The machine of claim 1, wherein the non-magnetic segments are formed as discrete components relative to the magnetic segments.

7. The machine of claim 1, wherein the rotor core includes rotor slots extending between the magnetic segments along the arc length of the rotor core, the non-magnetic segments comprising filler material within the rotor slots.

8. The machine of claim 1, further comprising a non-magnetic rotor sleeve extending around the circumference of the rotor core.

9. The machine of claim 1, wherein the rotor core comprises a rotor base and rotor teeth radially extending from the rotor base relative to the central longitudinal axis, the magnetic segments defining the rotor teeth, and the non-magnetic segments extending between the rotor teeth along the arc length of the rotor core.

10. The machine of claim 1, wherein the rotor core is a segmented rotor core.

11. The machine of claim 1, wherein the DC field coil is wound around two or more of the stator teeth positioned adjacent to each other along the arc length of the stator core.

12. The machine of claim 1, wherein the stator core comprises stator slots that radially extending from the stator base relative to the central longitudinal axis, the stator slots arranged with the stator teeth in an alternating pattern along the arc length of the stator core, the DC field coil comprising a first DC field coil and the stator including a second DC field coil, the first and second DC field coils having first and second ends, respectively, that extend and oppose each other within a common stator slot of the stator slots.

13. The machine of claim 1, wherein each of the non-magnetic segments has a shape that is asymmetric about all of the radial axes of the rotor core.

14. A machine comprising:
a rotor comprising a rotor core configured to rotate about a central longitudinal axis, the rotor core having an outer circumference along an arc length of the rotor core, the rotor core comprising magnetic segments and non-magnetic segments arranged in an alternating pattern along the arc length of the rotor core, wherein each of the magnetic segments has a shape that is asymmetric about all radial axes of the rotor core that radially extend outward from the central longitudinal axis, wherein the magnetic segments and non-magnetic segments are integrally formed with each other; and
a stator comprising a stator core that extends along the central longitudinal axis and along an arc length, the stator core comprising a stator base and stator teeth that radially extend from the stator base relative to the central longitudinal axis, the stator comprising a direct current (DC) field coil wound around at least one corresponding stator tooth of the stator teeth, the stator comprising an alternating current (AC) armature coil wound around at least one corresponding stator tooth of the stator teeth, wherein the DC field coil overlaps the AC armature coil along the arc length of the stator core.

15. The machine of claim 14, wherein the stator comprises a plurality of the DC field coils, the AC armature coil is a first phase AC armature coil, and the stator includes second and third phase AC armature coils, the first, second, and third phase AC armature coils representing a set of three-phase windings, the DC field coils being interleaved between the first, second, and third phase AC armature coils along the arc length of the stator core in an overlapping manner with the first, second, and third phase AC armature coils.

16. The machine of claim 14, wherein the rotor core comprises a rotor base and rotor teeth that radially extend from the rotor base relative to the central longitudinal axis, the magnetic segments defining the rotor teeth, and the non-magnetic segments extend between the rotor teeth along the arc length of the rotor core.

17. The machine of claim 14, wherein the rotor core is a segmented rotor core.

18. The machine of claim 14, wherein each of the non-magnetic segments has a shape that is asymmetric about all of the radial axes of the rotor core.

19. A machine comprising:
a rotor comprising a rotor core configured to rotate about a central longitudinal axis, the rotor core having an outer circumference along an arc length of the rotor core, the rotor core comprising magnetic segments and non-magnetic segments arranged in an alternating pattern along the arc length of the rotor core, the rotor core including rotor slots extending between magnetic segments along the arc length of the rotor core, wherein each of the magnetic segments has a shape that is asymmetric about all radial axes of the rotor core that radially extend outward from the central longitudinal axis; and a stator comprising a stator core that extends along the central longitudinal axis and along an arc length, the stator core comprising a stator base and stator teeth that radially extend from the stator base relative to the central longitudinal axis, the stator comprising a direct current (DC) field coil wound around at least one corresponding stator tooth of the stator teeth, the stator comprising an alternating current (AC) armature coil wound around at least one corresponding stator tooth of the stator teeth, wherein the DC field coil overlaps the AC armature coil along the arc length of the stator core.

20. The machine of claim 19, further comprising a non-magnetic rotor sleeve extending around the circumference of the rotor core.

\* \* \* \* \*